United States Patent
Crosby et al.

(10) Patent No.: US 10,468,898 B2
(45) Date of Patent: Nov. 5, 2019

(54) IMPLEMENTATION OF HIGH EFFICIENCY BATTERY CHARGER FOR ELECTRONIC DEVICES

(71) Applicant: NXP B.V., Eindhoven (NL)

(72) Inventors: Robert Glenn Il Crosby, Livermore, CA (US); Peter Christiaans, Mountain View, CA (US)

(73) Assignee: NXP B.V., Eindhoven (NL)

(*) Notice: Subject to any disclaimer, the term of this patent is extended or adjusted under 35 U.S.C. 154(b) by 198 days.

(21) Appl. No.: 15/668,514

(22) Filed: Aug. 3, 2017

(65) Prior Publication Data

US 2018/0337545 A1 Nov. 22, 2018

Related U.S. Application Data

(63) Continuation-in-part of application No. 15/600,244, filed on May 19, 2017, now Pat. No. 10,312,724.

(51) Int. Cl.
| | |
|---|---|
| *H02J 7/00* | (2006.01) |
| *H02J 7/04* | (2006.01) |
| *H02M 3/07* | (2006.01) |
| *H02M 3/158* | (2006.01) |
| *H02M 1/00* | (2006.01) |

(52) U.S. Cl.
CPC .......... *H02J 7/0068* (2013.01); *H02J 7/0027* (2013.01); *H02J 7/0077* (2013.01); *H02J 7/045* (2013.01); *H02M 3/07* (2013.01); *H02M 3/158* (2013.01); *H02J 7/0052* (2013.01); *H02J 2007/0059* (2013.01); *H02M 2001/007* (2013.01); *H02M 2003/072* (2013.01); *H02M 2003/077* (2013.01)

(58) Field of Classification Search
CPC ............................ H02J 7/0068; H02J 7/0027
USPC ......................................................... 320/114
See application file for complete search history.

(56) References Cited

U.S. PATENT DOCUMENTS

| | | | |
|---|---|---|---|
| 9,065,392 B2 | 6/2015 | Myles | |
| 2004/0263231 A1* | 12/2004 | Trafton | H02M 3/073 |
| | | | 327/327 |
| 2008/0158915 A1 | 7/2008 | Williams | |

(Continued)

FOREIGN PATENT DOCUMENTS

| | | |
|---|---|---|
| EP | 2903126 A1 | 8/2015 |
| WO | WO-2009/017783 A1 | 2/2009 |
| WO | WO-2012/151466 A2 | 11/2012 |

OTHER PUBLICATIONS

Reusch, David Clayton; "High Frequency, High Power Density Integrated Point of Load and Bus Converters", Dissertation Doctor of Philosophy in Electrical Engineering, Virginia Polytechnic Institute and State University, Blacksburg, Virginia. US: 232 pages.

(Continued)

*Primary Examiner* — Suchin Parihar

(57) ABSTRACT

A power converter including a buck converter to receive input power and set operating voltages of the power converter, a current sensing circuit to determine an input current of the power converter, a charge pump circuit to store charge delivered by the voltage regulation circuit and output to a load and to a battery pack a current larger than the input current, and a battery pack controller to control switching and provide feedback within the power converter.

17 Claims, 4 Drawing Sheets

(56) References Cited

U.S. PATENT DOCUMENTS

| | | |
|---|---|---|
| 2008/0159815 A1* | 7/2008 | Manthei ................ E02D 29/025 405/286 |
| 2009/0010035 A1 | 1/2009 | Williams |
| 2012/0043818 A1 | 2/2012 | Stratakos et al. |
| 2015/0214848 A1 | 7/2015 | Umetani |
| 2018/0041060 A1 | 2/2018 | Walley et al. |
| 2018/0074564 A1 | 3/2018 | Paparrizos et al. |
| 2018/0166902 A1* | 6/2018 | Huang ..................... H02J 7/00 |
| 2018/0337539 A1 | 11/2018 | Christiaans et al. |
| 2018/0337545 A1 | 11/2018 | Crosby et al. |

OTHER PUBLICATIONS

U.S. Appl. No. 15/458,734; not yet published; 28 pages filed Mar. 14, 2017.
Notice of Allowance, U.S. Appl. No. 15/600,244; 13 pages (dated Jan. 22, 2019).
Final Office Action, U.S. Appl. No. 15/600,244; 16 pages (dated Oct. 26, 2018).
Non-Final Office Action; U.S. Appl. No. 15/600,244; 13 pages dated Jun. 14, 2018.

* cited by examiner

IMPLEMENTATION OF HIGH EFFICIENCY BATTERY CHARGER FOR ELECTRONIC DEVICES

CROSS-REFERENCE TO RELATED APPLICATIONS

This application is a Continuation-in-Part of application Ser. No. 15/600,244, filed May 19, 2017, which is hereby incorporated by reference for all purposes as if fully set forth herein.

TECHNICAL FIELD

Various embodiments disclosed herein relate to charging of mobile and other electronic devices, including implementation options for designing a high-efficiency 2:1, 3:1, and 3:2 switched capacitor converters for high-voltage direct battery charging. Alternatively, the device can be set in a bypass mode providing a direct 1:1 power path from Vin to Vout. Both 8-FET and 9-FET topology approaches are described, along with the applicable control circuitry. An additional 9-FET topology is described, whereby a buck regulator is placed in parallel with the ninth FET to provide high-efficiency power transfer when the Vin to Vout ratio is higher than an available switched-capacitor converter ratio.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a power converter including a buck converter to receive input power and set operating voltages of the power converter, a current sensing circuit to determine an input current of the power converter, a charge pump circuit to store charge delivered by the voltage regulation circuit and output to a load and to a battery pack a current larger than the input current; and a battery pack controller to control switching and provide feedback within the power converter.

The buck converter may be used in reverse-boost mode to supply power from the battery pack back to a voltage input.

The charge pump circuit may include a plurality of first transistors at a first voltage rating and a plurality of second transistors at a second voltage rating twice the first voltage rating. An output voltage may be produced at ratios of 1.5 times, two times, or three times an input voltage.

The buck converter may include a pair of transistors and an inductor.

The charge pump circuit may include a plurality of back gate transistors to block leakage current from output to input.

The charge pump circuit may include a pair of flying capacitors that are alternatively switched to provide power to a load.

The charge pump circuit may include a pair of input transistors and the charge pump circuit includes a pair of back gate transistors, a pair of mid-point transistors, and a pair of grounding transistors.

An input transistor and a mid-point transistor may be switched ON to charge the charge pump and are switched OFF to discharge the charge pump. A back gate transistor and a grounding transistor may be switched ON to discharge the charge pump and are switched OFF to charge the charge pump. The back gate transistors may be turned ON to prevent reverse current in the power converter from output to input.

Various embodiments also include a method of charging a power adapter having a power converter including receiving input power and setting operating voltages of the power converter using a buck converter, determining an input current of the power converter using a current sensing circuit, storing charge by a charge pump circuit delivered by the voltage regulation circuit and outputting to a load and to a battery pack a current larger than the input current, and controlling switching and providing feedback within the power converter using a battery pack controller.

The method may include switching ON a first input transistor of the buck converter and switching ON a first mid-point transistor of the charge pump circuit to charge a first flying capacitor of the charge pump circuit in a first half cycle. The method may further include switching ON a second input transistor of the buck converter and switching ON a second mid-point transistor of the charge pump circuit to charge a second flying capacitor of the charge pump circuit in a second half cycle.

The method may include switching OFF a first back gate transistor of the charge pump circuit and switching OFF a first grounding transistor of the charge pump circuit to discharge a first flying capacitor of the charge pump circuit in a first half cycle. The method may further include switching OFF a second back gate transistor of the charge pump circuit and switching OFF a second grounding transistor of the charge pump circuit to discharge a second flying capacitor of the charge pump circuit in a second half cycle.

The method may include switching ON a pair of back gate transistors to prevent reverse current from output to input in the power converter.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
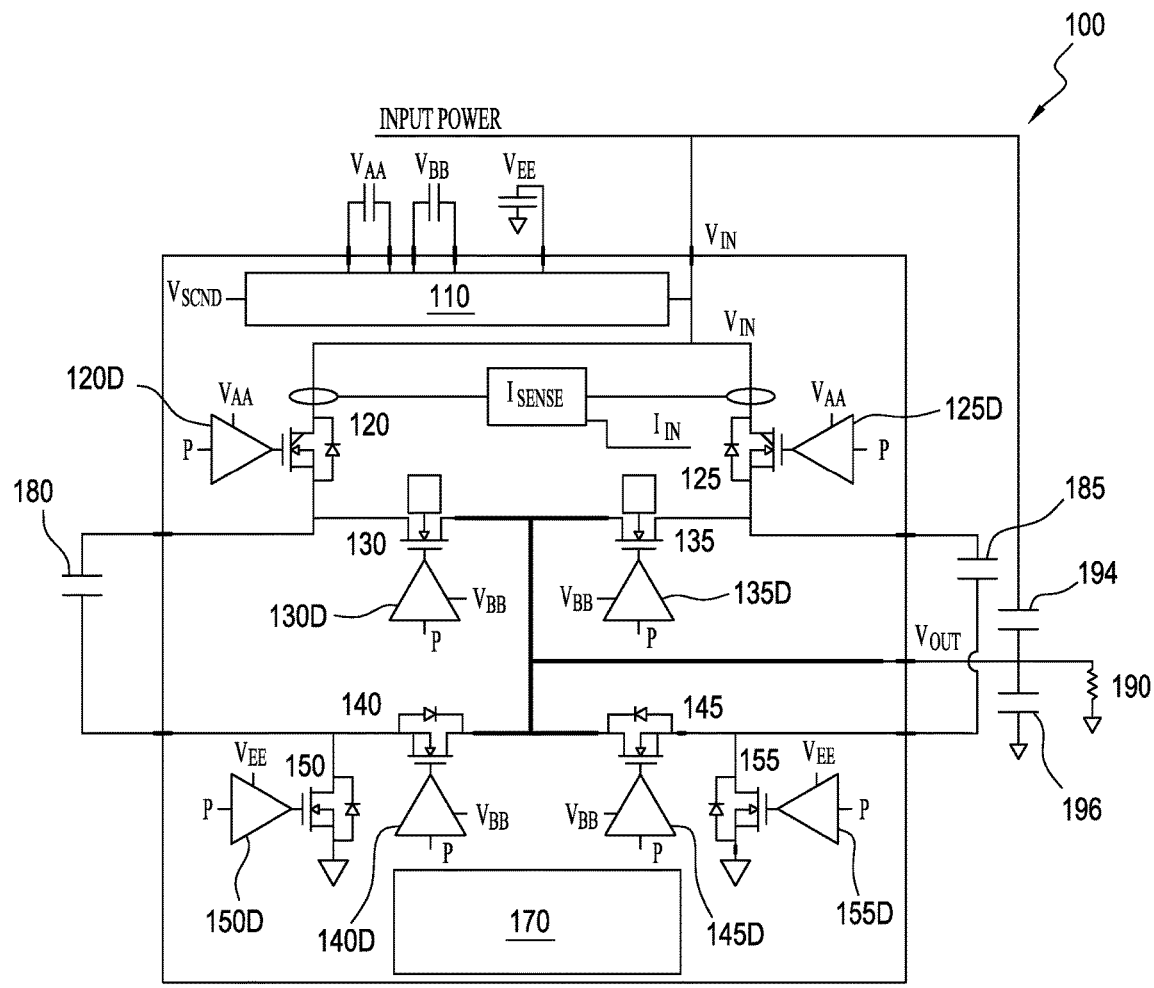
FIG. 1 illustrates an 8-FET circuit topology of a power converter in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Rapid battery charging of smart phones, other mobile devices, and small electronic devices has become increasingly important over the last few years. Charging currents have traditionally been limited to about three amps because of limitations of cables, connectors, and the rate of charge acceptance by Lithium ion (Li-ion) batteries in the mobile devices. Advances in the achievable charge acceptance rates have recently allowed some mobile device batteries to be charged at much higher currents, for example, between six and ten amps for a three amp-hour battery. A commercially available response to this new battery capability was implemented using high-current travel adapters with a special high-current cable and high-current connectors on both ends, providing high-current at a varying voltage with the state-of-charge of the battery.

Embodiments described herein facilitate high-current charging of a Li-ion battery without the complications of a high-current travel adapter and non-standard cables and connectors on the device. Embodiments may be realized using implementation of a 2:1 switched capacitor converter that doubles the input current and halves the input voltage in a very high efficiency converter.

Embodiments described herein include various implementations using a 2:1 switched-capacitor converter that may be used in battery charging of mobile devices and other electronic components.

FIG. 1 illustrates an 8-FET circuit topology of a power converter 100 ("converter") in accordance with embodiments described herein. The converter 100 may include an internal power conditioning circuit 110 to receive input voltage $V_{IN}$ from a power source and provide power signals to driver circuits of the components of the converter 100. Components of the converter 100 may include input transistors 120 and 125, controlled by respective input driver circuits 120D and 125D. The input driver circuits 120D and 125D may receive a power signal $V_{AA}$ from the internal power conditioning circuit 110. Converter 100 may include back gate transistors 130 and 135 controlled by respective back gate driver circuits 130D and 135D. The back gate driver circuits 130D and 135D may receive a power signal $V_{BB}$ from the internal power conditioning circuit 110. Converter 100 may also include mid-point transistors 140 and 145 controlled by respective mid-point driver circuits 140D and 145D, and receive the power signal $V_{BB}$ from the internal power conditioning circuit 110. Converter 100 may include grounding transistors 150 and 155 controlled by respective grounding driver circuits 150D and 155D. The grounding driver circuits 150D and 155D may receive a power signal $V_{EE}$ from the internal power conditioning circuit 110. In addition to $V_{IN}$, the internal power conditioning circuit 110 may have a secondary output $V_{SCND}$ that may be used in some conditions to efficiently pull some chip internal power from $V_{SCND}$ instead of $V_{IN}$. Functionality of the various driver circuits are controlled by a power path controller sensing and logic block 170 ("power path controller 170").

Transistors 120 and 125 may have voltage ratings high enough and be of sufficient size to survive a maximum input voltage that the converter 100 will encounter. Input voltage $V_{IN}$ may be in the range of the battery voltage up to about 20V. A battery to be charged may be rated at 5V and operate from 3V to 5V. The other six transistors 130, 135, 140, 145, 150, and 155 may be smaller and may use a voltage rating on the order of the maximum output voltage, normally around 5V for Li-ion battery-powered applications. Regulation of the output voltage $V_{OUT}$ is accomplished by controlling the voltage of respective input driver circuits 120D and 125D that correspond to the two input transistors 120 and 125. Current sensing may be implemented to determine the input current $I_{IN}$ by mirroring currents through transistors 120 and 125. Reverse current protection is implemented using back gate switching of the transistors 130 and 135 when the device is not transferring power. Current sensing for the 8-FET topology may be accomplished by various methods. Current mirror circuits for input transistors 120 and 125 can feed into an integrator circuit that produces a voltage proportional to the average current into a chip using the converter 100.

The converter 100 including the 8-FET topology illustrated in FIG. 1 includes a two-phase 2:1 switched-capacitor arrangement, adding output regulation capability and reverse-current protection. With an output regulation capability, the converter 100 may provide an output voltage $V_{OUT}$ that is roughly one-half of the input voltage $V_{IN}$, and the output current $I_{OUT}$ may be twice the input current $I_{SENSE}$. Battery charging applications using the converter 100 are able to control $V_{OUT}$ and $I_{OUT}$ with a high degree of accuracy Voltage regulation may be achieved by the input transistors 120 and 125 in the 8-FET topology. Transistors 120 and 125 may be larger and more robust, able to handle higher voltages. The other transistors 130, 135, 140, 145, 150, and 155 may be rated for the maximum desired output voltage. The transistors described herein may be NMOS or PMOS.

In the converter 100, measured values of $V_{IN}$, $V_{OUT}$, and $I_{SENSE}$ may be input to the power path controller 170 that subsequently provides feedback and control to circuit components within the converter 100. The $V_{IN}$, $V_{OUT}$, and $I_{SENSE}$ signals may be analog inputs that are converted to digital signals by the power path controller 170. Alternatively the power path controller 170 may receive analog inputs and use analog controls to control components of the converter 100. The power path controller 170 may communicate with the internal power conditioning circuit 110 and have connections to the driver circuits to control actions of the converter 100. For example, the power path controller 170 may vary a control signal sent to the input driver circuits 120D or 125D to vary the output voltage of respective input transistors 120 and 125. Power path controller 170 may control back gate driver circuits 130D and 135D that drive back gates 130 and 135 respectively. When the converter 100 is not operating in a power transfer mode, respective back gates 130 or 135 are reversed from a default orientation such that current cannot flow from $V_{OUT}$ to $V_{IN}$, and thus current leakage in the direction from $V_{OUT}$ to $V_{IN}$ may be prevented.

The converter 100 may also function as a charge pump circuit 142 having flying capacitors 180 and 185 controlled by a plurality of FETs. The charge pump circuit 142 may include components described above including back gate transistors 130 and 135, back gate drivers 130D and 135D, mid-point transistors 140 and 145, mid-point drivers 140D and 145D, grounding transistors 150 and 155, and grounding drivers 150D and 155D. Flying capacitors 180 and 185 are also known as switching capacitors. Flying capacitors 180 and 185 may float with respect to ground. The power path controller 170 may operate the converter 100 in a dual switched mode, alternating the store of charge in flying capacitors 180 and 185 every half cycle before alternately discharging a capacitance and sending current through the load 190. The action of connecting the load 190 each half cycle to the converter 100 is done with the purpose of doubling the input current at the load 190 while the input voltage may be halved or reduced by other divisor by the input transistors 120 and 125 under the control of the power path converter 170.

An additional way to determine the input current $I_{SENSE}$ is to compute a change in voltage across the flying capacitors 180 or 185 during a portion of a charge cycle when the respective capacitor 180 or 185 is connected between $V_{IN}$ and $V_{OUT}$. This measurement may vary with the effective capacitance of the external flying capacitors, therefore a known current source may be implemented in the chip to function as in-circuit calibration to account for variations in the external components. The converter 100 may further include decoupling capacitors 194 and 196 to smooth out the output signal to the load 190.

In operation, the 8-FET topology of FIG. 1 may function in the following manner. The mid-point transistors 140 and 145 may be switched ON and OFF at the same time as input transistors 120 and 125. Transistors 130 and 135 may likewise be switched ON and OFF in conjunction with grounding transistors 150 and 155. During normal operation, the back-gates of transistors 130 and 135 remain in an orientation with diode anodes at Vout.

During a time T1, which may be fifty percent of a full cycle, the power path controller 170 may turn ON transistors 120 and 140, connecting flying capacitor 180 between $V_{IN}$ and $V_{OUT}$. Transistors 130 and 150 are turned OFF. During this same time T1, the power path controller 170 turns ON transistors 135 and 155, connecting flying capacitor 185 between $V_{OUT}$ and ground. Transistors 125 and 145 are turned OFF.

For the second half of the cycle during a time T2, transistors 125 and 145 are switched ON, connecting flying capacitor 185 between $V_{IN}$ and $V_{OUT}$. Transistors 135 and 155 are OFF. During this same time T2, the power path controller 170 turns ON transistors 130 and 150, connecting flying capacitor 180 between $V_{OUT}$ and ground. Transistors 120 and 140 are switched OFF.

During the time T1, the flying capacitor 180 charges to a level of $V_{CHARGE}$, and the flying capacitor 185 discharges to the load 190, after an initial charging half-cycle. During the time T2, the flying capacitor 180 discharges to the load 190, and the flying capacitor 180 charges to the level of $V_{CHARGE}$.

The level of $V_{CHARGE}$ is determined by the power path controller 170. Depending on a desired output charging voltage for the load 190, the power path controller 170 may vary the drive signals to input driver circuits 120D and 125D to vary the level of output $V_{CHARGE}$ that is ultimately sent along $V_{OUT}$ to the load 190.

As discussed herein, back gate transistors 130 and 135 may be used to block leakage current that might normally flow from $V_{OUT}$ to $V_{IN}$. In a normal configuration, when there is power on the battery side at $V_{OUT}$ and zero volts at $V_{IN}$, there is a leakage from $V_{OUT}$ to $V_{IN}$. This is undesired as it would drain the battery. Therefore the back gate transistors 130 and 135 may be NMOS FETs, though not limited thereto, that are configured such that the direction of the body diode inside the transistor may be reversed and block the reverse current.

Figure 2:
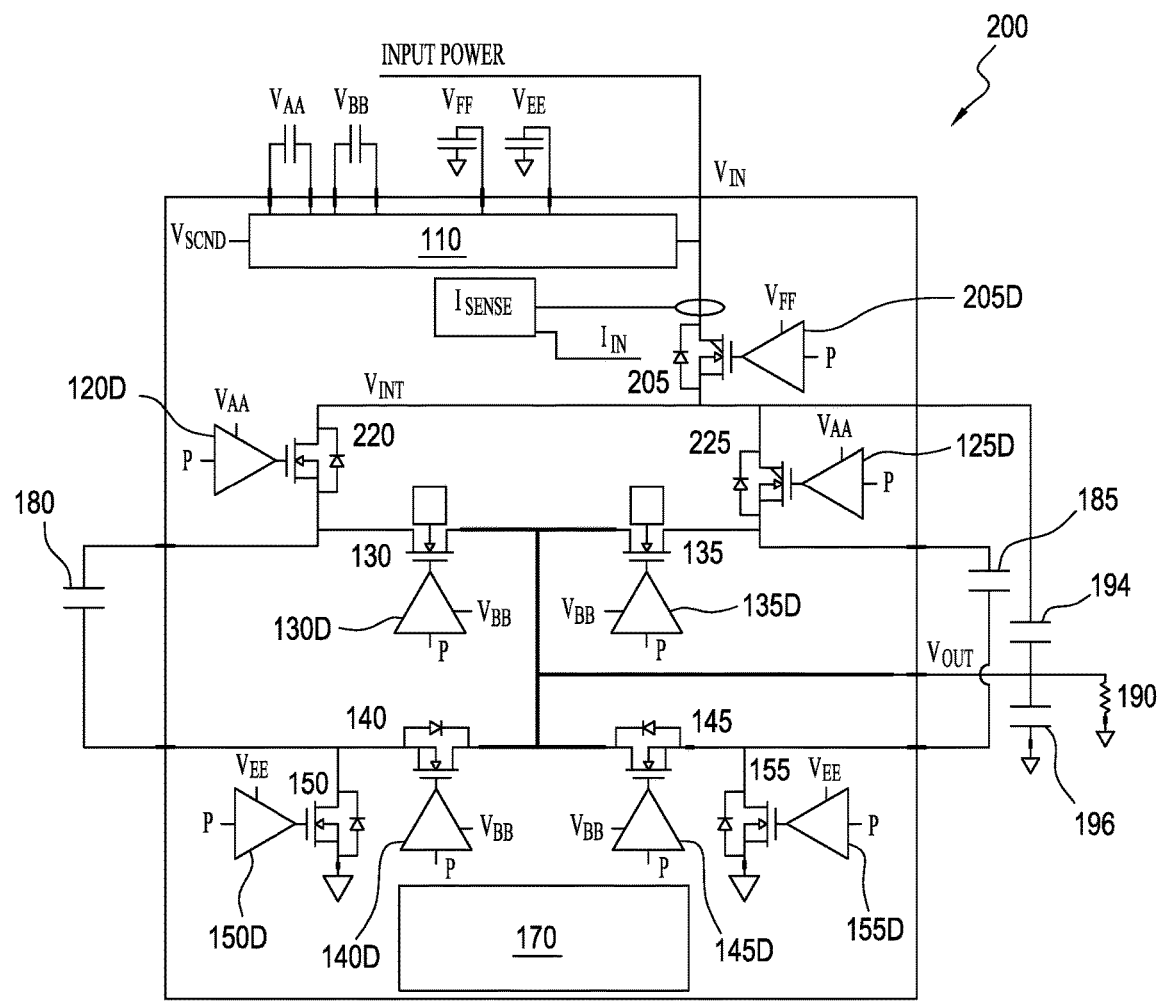
FIG. 2 illustrates a 9-FET circuit topology of a power converter in accordance with embodiments described herein.

FIG. 2 illustrates a 9-FET circuit topology of a power converter 200 in accordance with embodiments described herein. Like numerals and components from FIG. 1 are reused in FIG. 2. In FIG. 2, an implementation of the power converter 200 may include the 9-FET topology, which differs from the 8-FET topology by adding an additional transistor, an input transistor 205, between $V_{IN}$ and the other eight transistors 220, 225, 130, 135, 140, 145, 150, and 155 of the 2:1 switched-capacitor converter 200. Use of the single input transistor 205 removes the switching capability from the initial voltage regulation stage. In this implementation, only the input transistor 205 may be rated and sized for the maximum expected input voltage, and the remainder of the transistors 220, 225, 130, 135, 140, 145, 150, and 155 may be rated and sized smaller for the maximum output voltage of the load 190. Regulation of the output $V_{INT}$ of the input transistor 205 is accomplished by the power path controller 170 controlling a voltage of a gate-driver circuit 205D for the input transistor 205. An additional power source $V_{FF}$, output by the internal power conditioning circuit 110 may be used to power the input gate driver circuit 215. Reverse-current protection in the power converter 200 may be accomplished in a similar manner as for the 8-FET implementation of FIG. 1, or by other techniques described herein.

In the 9-FET topology illustrated in FIG. 2, output voltage regulation is accomplished by feedback and control from the power path controller 170 by sending a control signal having various voltage levels to set the output voltage level $V_{INT}$ used to power the load 190. For example, a low voltage signal from the power path controller 170 will induce a low voltage on the gate of the input transistor 205 resulting in a low $V_{INT}$. A higher voltage signal from the power path controller 170 will induce a higher voltage on the gate of the input transistor 205 resulting in a higher $V_{INT}$. $V_{INT}$ will typically be the switched-capacitor conversion ratio times Vout.

According to embodiments described herein, when the converters 100 or 200 are not operating in a power transfer mode, the back gate transistors 130 and 135 are reversed by the power path controller 170 from their default orientation, and current leakage from $V_{OUT}$ to $V_{IN}$ is prevented. Alternatively, for the converter 200 illustrated in FIG. 2, a switching action of a back gate transistor could be implemented on the input transistor 205. Current sensing may be performed in the 9-FET configuration, and can be accomplished by a current mirror at the input transistor 205 that is configured to provide a signal proportional to the current through the input transistor 205 that can be low-pass filtered into a sensing circuit to measure average current.

Both topologies illustrated in FIGS. 1 and 2 use the gate voltage control on the input FETs, the input transistor 205 in the 9-FET implementation and input transistors 120 and 125 in the 8-FET implementation to regulate the output of the converters 100 and 200 and the voltage stresses seen by the other switching transistors. Because the input transistors are controlled to output a voltage at the high side of each of the flying capacitors, 180 and 185, not significantly greater than twice the desired output voltage, stress caused by higher voltages on the non-input transistors are avoided. Once at a level $V_{CHARGE}$, an output voltage can be further adjusted within a power adapter or similar output mechanism to a desired usage level.

Output impedance may be controlled by controlling the gate voltage of input transistor 205 in the 9-FET implementation or input transistors 120 and 125 in the 8-FET implementation. Embodiments described herein may sense the current through the converters internally. As described herein a small subset of the transistors used may have a higher voltage rating, transistor 205 in the 9-FET implementation or input transistors 120 and 125 in the 8-FET implementation.

The 9-FET implementation of FIG. 2 may operate in a similar manner as the 8-FET implementation of FIG. 1. The switching action of the charge pump circuit and the power path controller 170 operate as described above. Voltage regulation may be performed by the single input transistor 205 and driver circuit 205D. An alternative use case scenario for the circuit is as a voltage multiplier in a reverse direction from Vout to Vin. Voltage regulation at Vin could then accomplished by adding back-gate control to transistor 205 and regulating the gate control voltage of the driver 205D to limit the voltage at Vin to a value less than twice the Vout voltage.

In response to desires in the industry for higher power components, traditional buck-converter implementations have been optimized for higher input voltages, around 9V, in order to provide higher output currents over standard 3 Amp cables. An output current has been limited by an efficiency of the buck converter and the saturation current of inductor components. In mobile device applications, for example, form-factor limitations on inductors have limited the maximum output current to around 5 Amps. More recently, 2-to-1 switched capacitor devices such as those described herein have been developed to provide high-current charging over standard cables. These 2:1 converters may be used in conjunction with travel-adapters that provide current at a voltage slightly higher than twice the battery voltage, with an output current approximately twice the input current. In practice, some mobile devices have put a 1:1 or 2:1 direct chargers in parallel with a buck charger in order to have the high efficiency and high-current capability of direct chargers and the wide input operating voltage range of the buck charger. Further embodiments described herein combine the aforementioned approaches into one hybrid device in such a manner that allows significantly higher-current, higher-efficiency charging across a wider input operating voltage range with significantly reduced die area and board space.

Figure 3:
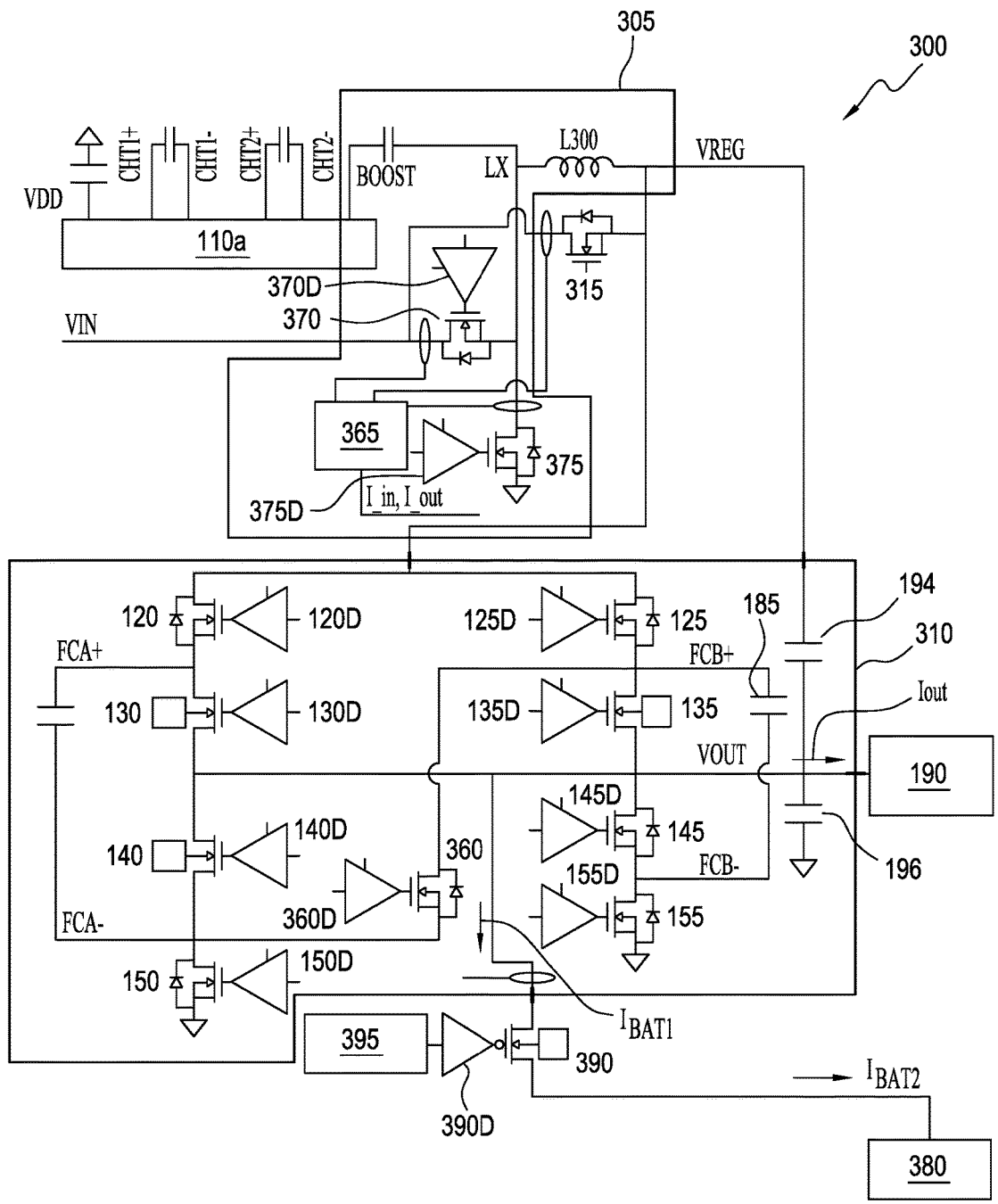
FIG. 3 illustrates a block diagram for 2:1 and 3:2 topology according to embodiments described herein.

FIG. 3 illustrates a block diagram for 2:1 and 3:2 topology 300 according to embodiments described herein including a buck converter 305 with reverse-boost in combination with a switched-capacitor converter 310. The buck converter 305 may receive input power and set operating voltages of the power converter. The buck converter may include transistors 370 and 375, respective drivers 370D and 375D, and an inductor L300 between LX and VREG nodes. The buck converter 305 may be in parallel with a bypass transistor, 315. Input and output current may be sensed by current sense circuit 365.

The switched-capacitor converter converter 310 may include the transistor configuration described herein in relation to FIGS. 1 and 2, having the 8- and 9-FET topologies, respectively. Transistors of the switched-capacitor converter 310 may include transistors 120, 125, 130, 135, 140, 145, 150, and 155, accompanying driver circuits as illustrated. In addition, a switching transistor 360 and driver circuit 360D may be included to allow the selection of additional input voltage to output voltage ratios for the switched-capacitor converter 310. These features allow for high efficiency operation across a wide input voltage range. Embodiments of FIGS. 1 and 2 are configured for 2:1 or 1:1 (bypass) ratios. As illustrated in FIG. 3, a 3:2 ratio is added. According to embodiments described herein, the efficiency of the switched capacitor converter 310 may be refined to ratios of input voltage to output voltage ratios of 1.5:1. The topology 300 may include an internal power conditioning circuit 110a in which signal voltages on various channels may be used to power the different gates and drivers according to embodiments described herein.

According to embodiments described herein, the input regulating transistor, FET 202 illustrated in FIG. 2, is replaced by a buck converter 305 including transistors 370 and 375, respectively driven by drivers 370D and 375D. The buck converter 305 includes an inductor L300 between a node LX and a node VREG. The inductor L300 is in parallel with the bypass transistor 315.

A target voltage of the buck converter 305 may be adjusted by a feedback circuit so as to provide a voltage to the switched-capacitor stage 310 to result in a desired output current, I_BAT1 to charge a battery pack 380. A battery pack FET 390 may be used to regulate an amount of current, resulting in I_BAT2 to charge the battery pack 380. The battery pack FET may be controlled by a battery pack controller 395. The battery pack controller 395 may be configured to control switching of the buck converter 305, switched-capacitor controller 310, and provide feedback within the power converter. The battery pack controller may also control a voltage level used to charge the battery pack 380, may control protection loops for chip temperature, battery temperature, input voltage at VIN, system voltage at VOUT, device input current, Iin, system output current, Iout, and battery current, Ibat.

Figure 4:
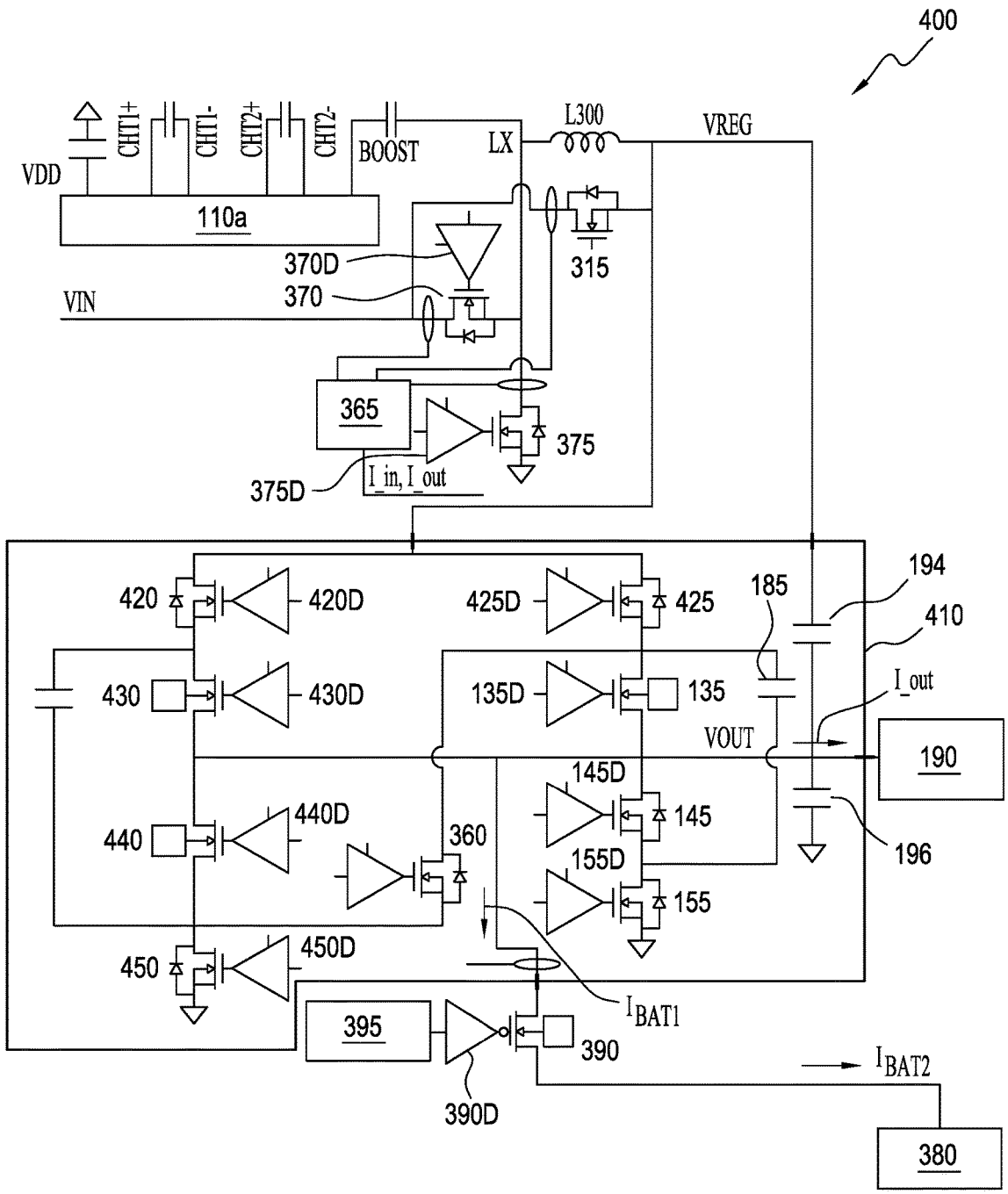
FIG. 4 illustrates a block diagram for 3:1, 2:1, and 3:2 topology according to embodiments described herein.

FIG. 4, which is similar to FIG. 3 except that the required voltage ratings of some transistors are higher, illustrates a block diagram for a 3:1, 2:1, and 3:2 topology 400 according to embodiments described herein. FIG. 4 includes a modification to the buck converter of FIG. 3 to extend the switched-capacitor ratios to include 3:1. This modification may minimize input current through a cable. This modification may be implemented by increasing a voltage rating of four of the nine switched capacitor FETs from VOUT to 2×VOUT and adding back-gate control to one more FET 440, having corresponding driver 440D. The increased 2×VOUT FETs include transistors 420, 425, 430, and 450.

A target voltage of the buck converter 400 may be adjusted by a feedback circuit so as to provide a voltage to the switched-capacitor stage to result in a desired output current or voltage to the battery, as well as protection loops for chip temperature, battery temperature, input voltage at VIN, system voltage at VOUT, I_in, and I_out.

A target battery current and voltage may be set by the battery charging control logic of the chip or from a host applications processor. High-side gate drive circuitry may be implemented in such a manner as to allow for 100% duty cycle operation. When the target voltage of the buck converter 400 causes the duty cycle to reach 100%, the bypass FET, 315 is then turned on to help bypass losses in the inductor L400 and high-side FET 470. If the feedback circuit moves the target voltage of the buck converter below VREG, then bypass transistor 315 is turned off and the duty cycle of the buck converter adjusts below 100%.

The feedback circuitry uses voltages, currents, and temperatures from various sources. According to embodiments described herein, if a maximum input operating voltage at VIN is exceeded, or is less than a voltage of the battery VBAT, power transfer is halted. If this circuit is being used within a mobile device, the mobile device system voltage may be measured at VOUT and is normally limited to about 5V for a Li-ion powered device. The input current, I_in, is measured by the current sense circuit 365 using the sum of currents sensed in transistor 370 and by-pass transistor 315, sensed in transistor 370 when the buck converter duty cycle is below 100%, and predominantly sensed in bypass transistor 315 when the duty cycle is 100% and the bypass transistor 315 has been turned on. The output current LOUT is sensed as the sum of the input current measured in transistor 370 and bypass transistor 315, plus the current through the low-side FET 375.

The sum of these currents is then multiplied by the conversion ratio of the switched-capacitor converter 300 or 400: 3:1, 2:1, 3:2, or 1:1. The optimal conversion ratio can be selected autonomously in on-chip logic, or determined by communications from the host applications processor. The battery charging current may be sensed through the battery transistor 390 and could also be sensed through an external resistor in the battery current path. An on-chip temperature sensor, not depicted, may be used for chip self-protection. The battery temperature may be sensed in an on-chip ADC, not depicted, with an input from the thermistor on the battery. An alternative implementation may include an additional external temperature sensor for the power connector of the mobile device, commonly included for high current 1:1 direct path charging. Charge parameters may be adjusted by battery charging control logic based upon a temperature sensed. An example of the possible adjustments includes the JEITA standard for Li-ion batteries.

The buck converter using topologies 300 or 400 may also be used in reverse-boost mode to supply power from the battery pack back to VIN so that accessories can be powered by the phone. In reverse-boost mode, the switches of the capacitive converter, transistor switches 120, 130, 150, 125, 135, and 155 are fully ON, and transistor switches 140, 360, 145, and bypass transistor 315 are fully OFF. Battery FET 390 is fully ON.

When the device is not operating in a power transfer mode, the back-gates of transistor 130 and transistor 135 are reversed from the default orientation, and current leakage back from VOUT to VIN may be prevented.

In accordance with FIG. 3, when the 3:2 voltage in to voltage out ratio is selected, the backgate of transistor 135D is reversed to prevent forward biasing the body diode in that part of the cycle when VOUT is connected to the stacked flying capacitors, with FCA+ connected to VOUT through transistor 130, FCA− connected to FCB+ through transistor 360, and FCB− is connected to ground through transistor 155.

In accordance with FIG. 4, in the 3:1 voltage in to voltage out ratio mode, the backgate of transistor 440 is reversed during that part of the cycle when the flying capacitors are stacked between VREG and VOUT, with FCA+ connected to VREG through transistor 420, FCA− connected to FCB+ through transistor 360, and FCB− is connected to VOUT through transistor 145.

Embodiments described herein use current sense summing for the various transistors of the buck converter to measure input and output currents. The input current is the sum of the currents in transistor 370 and bypass transistor 315, measured in an integrating current mirror. The output current is then the sum of the currents in transistor 370, transistor 375, and bypass transistor 315, multiplied by the conversion ratio of the switched-capacitor converter.

According to embodiments described herein, high-efficiency charging of electronic devices is possible across a wide input voltage range with a cascaded buck-converter (with a bypass) and a multi-ratio switched capacitor converter. Using the buck-converter before the switched-capacitor converter makes use of a small inductor because current in the buck converter is multiplied by the switched-capacitor ratio before reaching the output. This is particularly important in some example mobile devices such as smart phones where device height and footprint are important.

Embodiments described herein use a target voltage of the buck converter to control the output voltage and output current of the switched-capacitor converter.

Embodiments described herein use dynamic back-gate control within the switched-capacitor converter for the 3:1 or 3:2 configurations to reduce the total number of transistors required to implement the additional ratios.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A power converter, comprising:
a switched-capacitor converter charge pump circuit;
a buck converter having a target voltage and configured to receive input power;
wherein the buck converter is configured to set a voltage sent to the switched-capacitor converter charge pump circuit based only on the target voltage;
a current sensing circuit to determine an input current of the power converter;
wherein the switched-capacitor converter charge pump circuit is configured to send an output current to a load and/or to a battery pack based only on the voltage set by the buck converter, wherein the output current is larger than the input current; and
a battery pack controller configured to provide the target voltage as feedback to the buck converter within the power converter.

2. The power converter of claim 1,
wherein the buck converter is used in reverse-boost mode to supply power from the battery pack back to a voltage input.

3. The power converter of claim 1, wherein the charge pump circuit includes
a plurality of first transistors at a first voltage rating and
a plurality of second transistors at a second voltage rating twice the first voltage rating.

4. The power converter of claim 3,
wherein an output voltage is produced at ratios of 1.5 times, two times, or three times an input voltage.

5. The power converter of claim 1,
wherein the buck converter comprises a pair of transistors and an inductor.

6. The power converter of claim 1,
wherein the charge pump circuit includes a plurality of back gate transistors to block leakage current from output to input.

7. The power converter of claim 1,
wherein the charge pump circuit includes a pair of flying capacitors that are alternatively switched to provide power to a load.

8. The power converter of claim 1, wherein
the charge pump circuit comprises a pair of input transistors and
the charge pump circuit includes a pair of back gate transistors, a pair of mid-point transistors, and a pair of grounding transistors.

9. The power converter of claim 8,
wherein an input transistor and a mid-point transistor are switched ON to charge the charge pump and are switched OFF to discharge the charge pump.

10. The power converter of claim 8,
wherein a back gate transistor and a grounding transistor are switched ON to discharge the charge pump and are switched OFF to charge the charge pump.

11. The power converter of claim 8,
wherein the back gate transistors are turned ON to prevent reverse current in the power converter from output to input.

12. A method of charging a power adapter having a power converter, comprising:
receiving input power and setting operating voltages of the power converter using a buck converter having a target voltage;
determining an input current of the power converter using a current sensing circuit;
storing charge by a charge pump circuit and outputting to a load and/or to a battery pack an output current larger than the input current;
wherein the buck converter is configured to set a voltage sent to the charge pump circuit based only on the target voltage;
wherein the charge pump circuit is configured to set the output current based only on the voltage set by the buck converter; and
controlling switching and providing the target voltage as feedback to the buck converter within the power converter using a battery pack controller.

13. The method of claim 12, further comprising
switching ON a first input transistor of the buck converter and switching ON a first mid-point transistor of the charge pump circuit to charge a first flying capacitor of the charge pump circuit in a first half cycle.

14. The method of claim 13, further comprising
switching ON a second input transistor of the buck converter and switching ON a second mid-point transistor of the charge pump circuit to charge a second flying capacitor of the charge pump circuit in a second half cycle.

15. The method of claim 12, further comprising
switching OFF a first back gate transistor of the charge pump circuit and switching OFF a first grounding transistor of the charge pump circuit to discharge a first flying capacitor of the charge pump circuit in a first half cycle.

16. The method of claim 15, further comprising
switching OFF a second back gate transistor of the charge pump circuit and switching OFF a second grounding transistor of the charge pump circuit to discharge a second flying capacitor of the charge pump circuit in a second half cycle.

17. The method of claim 12, further comprising
switching ON a pair of back gate transistors to prevent reverse current from output to input in the power converter.

* * * * *